United States Patent
Wooten

(10) Patent No.: US 9,230,109 B2
(45) Date of Patent: Jan. 5, 2016

(54) TRUSTED PLATFORM MODULE SECURITY

(75) Inventor: David Wooten, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1502 days.

(21) Appl. No.: 12/246,542

(22) Filed: Oct. 7, 2008

(65) Prior Publication Data
US 2010/0088523 A1 Apr. 8, 2010

(51) Int. Cl.
*H04L 29/06* (2006.01)
*G06F 21/57* (2013.01)
*H04L 9/08* (2006.01)

(52) U.S. Cl.
CPC .............. *G06F 21/57* (2013.01); *H04L 9/0836* (2013.01); *H04L 9/0897* (2013.01); *H04L 9/0861* (2013.01)

(58) Field of Classification Search
CPC ... H04L 9/0861; H04L 9/0863; H04L 9/0866; H04L 9/0869; H04L 9/0877; H04L 9/0894; H04L 9/0897; H04L 9/3234; H04L 2209/127; G06F 21/57
USPC ............................................... 380/44, 45, 284
See application file for complete search history.

(56) References Cited

U.S. PATENT DOCUMENTS

| | | | |
|---|---|---|---|
| 7,275,263 B2 | 9/2007 | Bajikar et al. | |
| 7,305,711 B2 | 12/2007 | Ellison et al. | |
| 7,711,960 B2 * | 5/2010 | Scarlata | H04L 9/0897 713/155 |
| 7,822,200 B2 * | 10/2010 | Cameron | G06F 21/445 380/278 |
| 7,900,058 B2 * | 3/2011 | Mabayoje et al. | ............. 713/189 |
| 8,290,164 B2 * | 10/2012 | Lietzke | G06F 21/57 380/277 |
| 2006/0053302 A1 | 3/2006 | Yasaki et al. | |
| 2006/0101286 A1 | 5/2006 | Catherman et al. | |
| 2006/0129824 A1 * | 6/2006 | Hoff et al. | ....................... 713/176 |
| 2006/0155988 A1 | 7/2006 | Hunter et al. | |
| 2007/0003064 A1 | 1/2007 | Wiseman et al. | |
| 2007/0014416 A1 | 1/2007 | Rivera et al. | |
| 2007/0073416 A1 | 3/2007 | Grawrock | |
| 2007/0226787 A1 * | 9/2007 | Maletsky | G06F 21/32 726/9 |
| 2008/0046581 A1 | 2/2008 | Molina et al. | |
| 2008/0192937 A1 * | 8/2008 | Challener | G06F 21/32 380/278 |

OTHER PUBLICATIONS

Lin, Amerson H. "Automated Analysis of Security API's", May 18, 2005, Massachusetts Institute of Technology, pp. 53-90.*
Lin, Amerson H. "Automated Analysis of Security APIs" retrieved at <<http://sdg.csail.mit.edu/pubs/theses/amerson-masters.pdf>>, May 18, 2005, pp. 1-124.
Murphy, Paul. "Hasta la Vista Secure TPM", "Managing L'unix" retrieved at <<http://blogs.zdnet.com/Murphy/?p=560>>, Mar. 28, 2006, pp. 1-4.
Balfe, et al. "Trusted Computing: Providing Security for Peer-to-Peer Networks", retrieved at <<http://www.isg.rhul.ac.uk/~kp/P2PTCieee.pdf>>, pp. 1-8.

* cited by examiner

*Primary Examiner* — Brian Shaw
*Assistant Examiner* — Daniel Potratz
(74) *Attorney, Agent, or Firm* — Alin Corie; Sandy Swain; Micky Minhas

(57) ABSTRACT

The described implementations relate to trusted platform module (TPM) security. One configuration that is implemented on a computing device includes a TPM configured to generate a key pair utilizing a factor stored on the TPM and an external cofactor that is not stored on the TPM. The computing device also includes a communication device configured to receive the external cofactor and convey the external cofactor to the TPM.

10 Claims, 5 Drawing Sheets

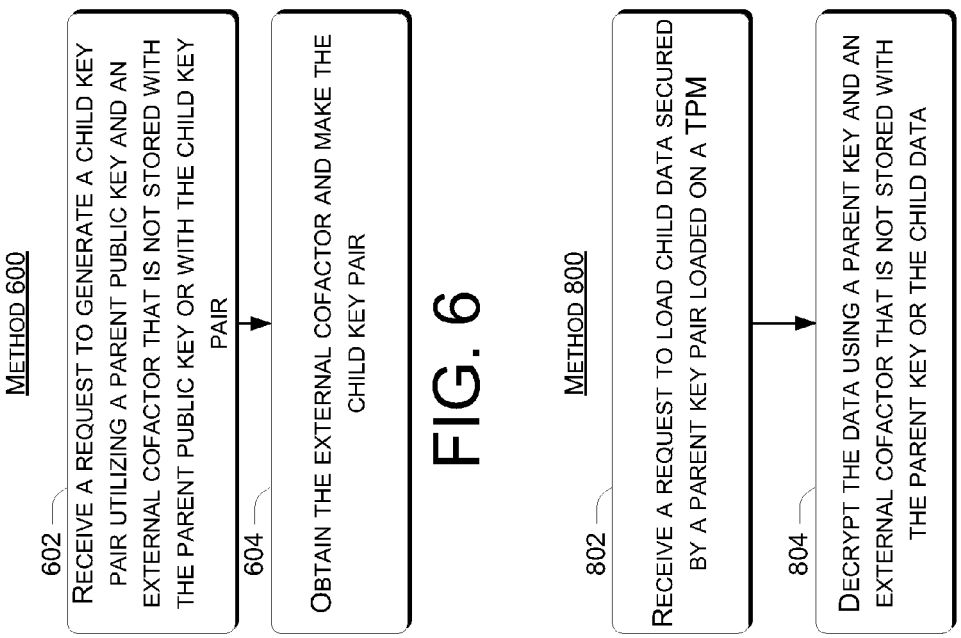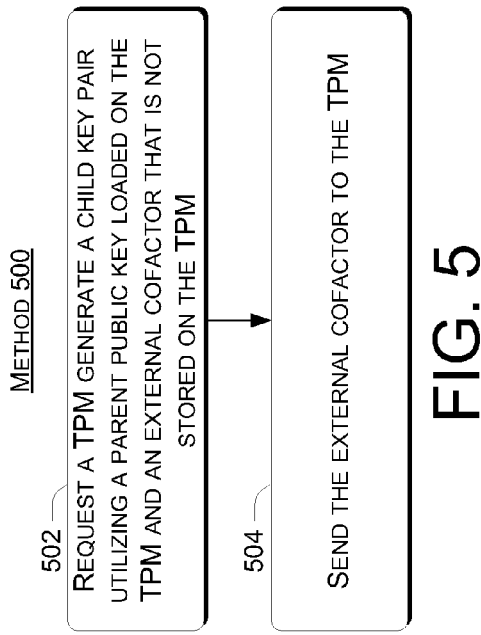

TRUSTED PLATFORM MODULE SECURITY

BACKGROUND

The current and planned versions of trusted platform modules (hereinafter, "TPMs") use an asymmetric key as the root of a key hierarchy. The asymmetric key is in the form of a storage root key (hereinafter, "SRK"). A private portion of this storage root key (hereinafter, "SRKpriv") is created on the TPM, and the TPM is designed not to output the SRKpriv key. A key hierarchy can then be constructed with keys "attached" to the SRK using its public key and then keys attached to those keys. This forms a chain of protections with one key protecting the next with the root of the protection being the SRK.

As a result of protecting a key hierarchy in this manner, disclosure of SRKpriv would allow someone to access any key in the hierarchy by opening each key in the hierarchy successively. Because of the importance of protecting the SRKpriv, attempts have been made to make TPMs tamper resistant. Designing and testing tamper resistance is costly both in time and money. The present implementations can offer more secure configurations with less or no potential downside.

SUMMARY

The described implementations relate to trusted platform module (TPM) security. One configuration that is implemented on a computing device includes a TPM configured to generate a key pair utilizing a factor stored on the TPM, and an external cofactor that is not stored on the TPM. The computing device also includes a communication device configured to receive the external cofactor and convey the external cofactor to the TPM.

Another implementation is manifested as a method that receives a request to load child data secured by a parent key pair loaded on a trusted platform module (TPM). The method also decrypts the child data using a parent key and an external cofactor that is not stored with the parent key or the child data. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIGS. 5-8 are flowcharts of exemplary trusted platform module security techniques in accordance with some implementations of the present concepts.

DETAILED DESCRIPTION

Overview

This patent application pertains to data security, and specifically to enhanced data security associated with a trusted platform module (TPM). Traditionally, if an attacker could obtain the TPM's root key (i.e., private storage root key (SRKpriv)) then the attacker could decrypt and access most or all data secured by the TPM. The inventive concepts mitigate this type of attack by allowing child keys formed by the TPM to have an external cofactor included in their encryption. The external cofactor is not stored on the TPM or with the child keys, so even a successful attack on the TPM that obtains the SRKpriv leaves the attacker unable to decrypt the child keys.

Exemplary Systems

Figure 1:
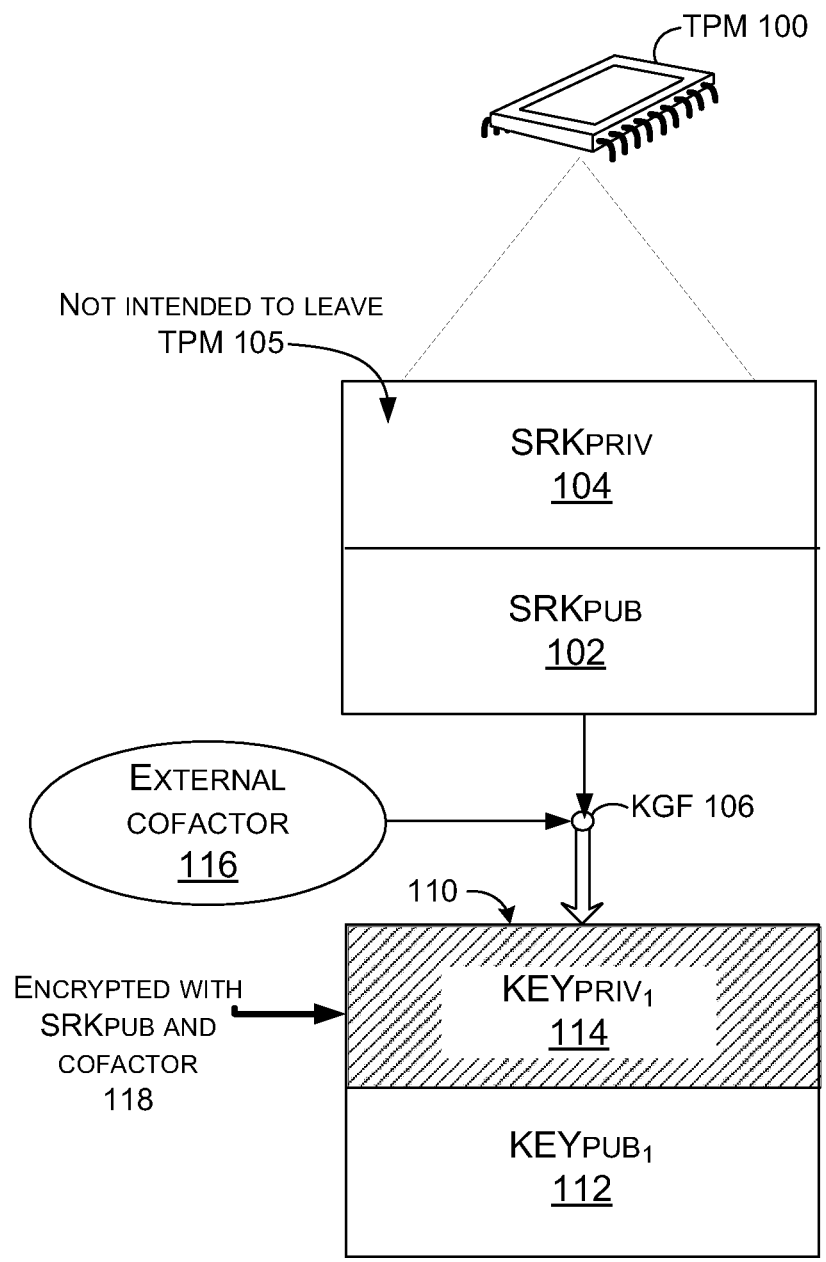
FIGS. 1-2 show exemplary trusted platform modules (TPMs) that are consistent with some implementations of the present concepts.
Figure 2:
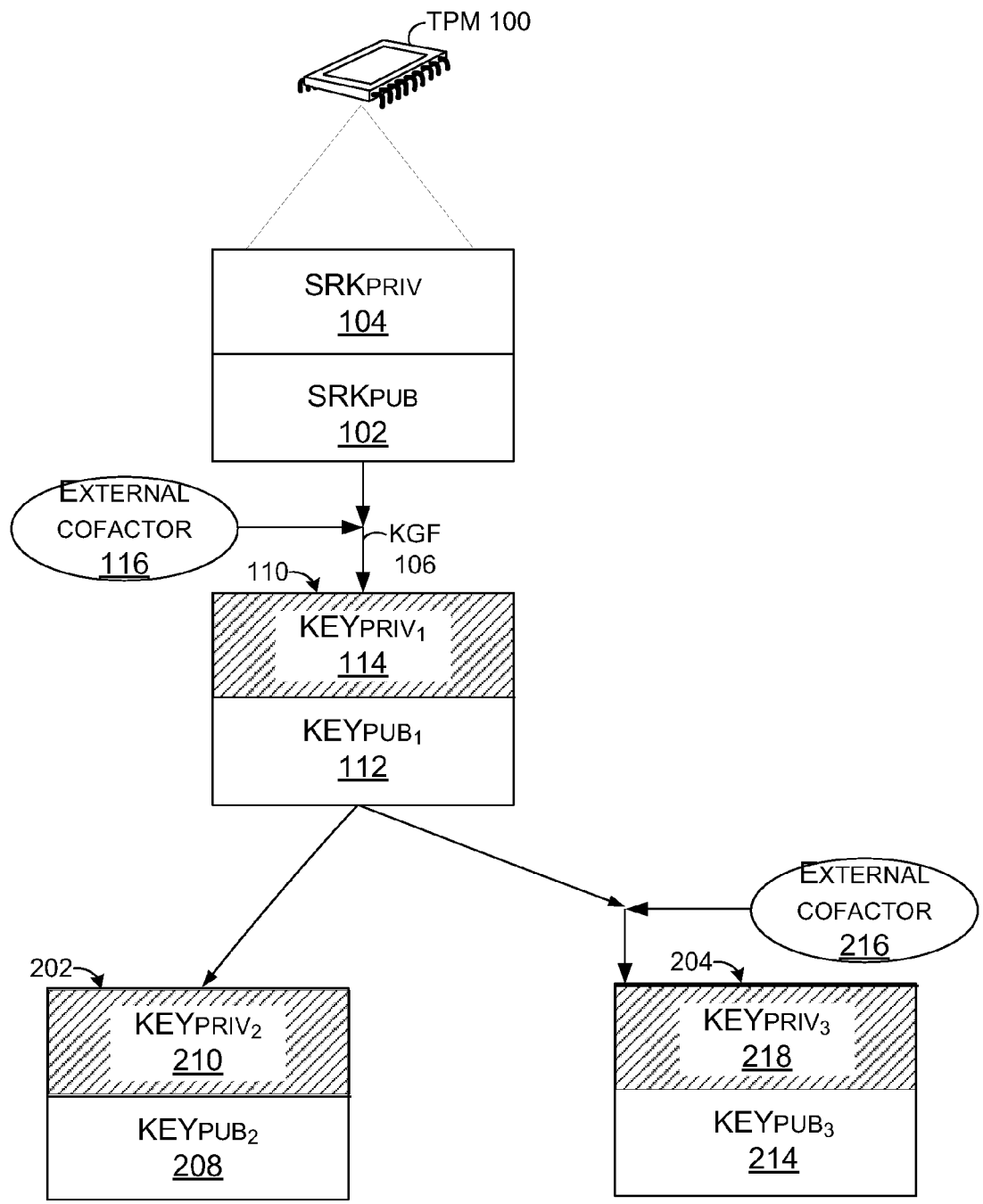

FIGS. 1-2 show examples of trusted platform modules (TPMs) configured to implement the present techniques. A TPM can be hardware, such as a silicon chip used to secure a key hierarchy.

FIG. 1 shows an exemplary TPM 100 that stores a storage root public key (SRKpub) 102 and a storage root private key (SRKpriv) 104. The SRKpub 102 is made available for use by other entities while the SRKpriv 104 is (intended to be) kept secret on the TPM and is not intended to leave TPM 100 as indicated at 105. The TPM can perform a key-generation function (KGF) 106 to generate a symmetric encryption key that is used to encrypt the sensitive portion of a child key pair 110. The sensitive portion includes the private portion of an asymmetric key pair. The child key pair 110 can contain a public key (KEYpub$_i$) 112 and a private key (KEYpriv$_i$) 114. An external cofactor 116 can be utilized in key generation as will be discussed below. The external cofactor is external in that it is not stored on the TPM 100 or with the child key pair 110. External cofactor 116 can be manifested in many forms and security levels. For instance, at one end of the continuum, the external cofactor can be as simple as a password, while at the other extreme, the external cofactor can have the same degree of robustness as the SRK keys. In either case, the external cofactor can be very hard to break since an attacker would not have any indication of its form or origin.

Key generation function 106 can encrypt the KEYpriv$_1$ 114 utilizing the TPM's SRKpub 102 and the external cofactor 116 as indicated at 118. For instance, the key generation function can be performed utilizing the TPM's SRKpub 102 and the external cofactor 116 to produce the encryption of the KEYpriv$_1$ 114. In such a case, KEYpriv$_1$ 114 can be thought of as having two protection factors: the first provided via the TPM's SRKpriv 104; and the second provided by the external cofactor. Accordingly, decryption of KEYpriv$_1$ 114 can only be accomplished with possession of SRKpriv 104 and external cofactor 116. Because the external cofactor is not kept with the TPM, the child keys are not compromised by disclosure of the SRKpriv. Also, because the TPM continues to provide one of the protection factors, there is no reduction in the strength of the protections and tools provided by the TPM. Examples of these protections and tools are discussed below in relation to FIG. 3.

FIG. 2 shows further functionality offered by TPM 100. In this case, the TPM has generated two more key pairs 202, 204 as offspring of child key pair 110 and grandchildren to the TPM's SRK key pair (102, 104). In the case of key pair 202, the TPM generates KEYpub$_2$ 208 and utilizes KEYpub$_1$ 112 from key pair 110 to generate KEYpriv$_2$ 210. Accordingly, knowledge of KEYpriv$_1$ 114 is utilized to decrypt KEYpriv$_2$ 210.

In the case of key pair 204, the TPM 100 generates KEYpub$_3$ 214 and utilizes KEYpub$_1$ 112, as well as an external cofactor 216 to encrypt a Kpriv$_3$ 218.

Key formation may also include an authorization value supplied by a requesting entity. The authorization value is then stored by the TPM. Any entity that subsequently requests loading a child key pair supplies the authorization value of the parent. The TPM can compare the supplied authorization value to the stored authorization value and only load the child key if the two values match. However, since the authorization value is stored on the TPM, the authorization value does not provide protection against TPM tampering (i.e., if someone cracks the TPM and extracts the SRKpriv they can get the authorization value).

For discussion purposes, two implementations for encryption and decryption of child key pairs are described below. The function of these and other implementations is to protect the child key pair utilizing both the SRK and the external cofactor. One implementation can employ Rivest, Shamir, Adleman (RSA) techniques and the other can employ elliptic curve cryptography (ECC) techniques.

RSA can function by encrypting symmetrically with the external cofactor then encrypting with the SRKpub key. Decryption entails decrypting with SRKpriv and then decrypting with the external cofactor. The relative order could also be reversed so that the process encrypts with SRKpub and then the external cofactor. Decryption would then entail decrypting with the external cofactor and then SRKpriv. A third option is to select a "cover key" and encrypt this cover key using the public key of the key's parent. The cover key would then be mixed with the external cofactor in a key generation function (KGF) to produce a symmetric encryption key that would then be used to encrypt the private portion of the newly created key.

ECC can create an ephemeral key and multiply the public portion of the ephemereal key (Qe) with the SRKpriv to produce an intermediate value. This can be mixed with the external cofactor in a KGF to produce a symmetric key. The symmetric key can be used to encrypt the private portion of the asymmetric child keys. Qe can be saved with the encrypted data. Decryption is performed utilizing Qe, which is multiplied with the SRKpriv to produce an intermediate value Z. When this Z value is mixed with the appropriate cofactor in a KGF, the original symmetric encryption key is recovered which can then be used to decrypt the child blob.

To summarize, in one scenario the parent key is an RSA key. In this case, the external cofactor can be utilized as a symmetric key to encrypt the sensitive data. Then the RSA key (parentPubKey) can be used to encrypt that data. The RSA parentPrivKey can then be used to decrypt the blob. Finally, the external cofactor can be used as a symmetric key to decrypt the recovered blob.

Another implementation can create a random value in the TPM. The random value can be mixed with the external cofactor in a KGF to produce an encryption key. The encryption key can be used for symmetric encryption of the sensitive data. Then the RSA key (parentPubKey) can be used to encrypt the random value. To recover (load) the child key, the TPM can use the parentPrivKey to decrypt the random value, and then mix that value with the externally provided cofactor in a KGF to recover the symmetric encryption key for the data.

In another scenario, the parent key can be an ECC key. A random number (de) can be created and then use ECC curve parameters to generate Qe=G*de. Qe will be saved in the block stored off chip in the clear. The TPM then uses the private portion of the parent ECC key (ds) to compute a Z=Qe*ds. This is a standard form of Diffie Hellman key exchange for ECC keys. The TPM can then use Z and the external cofactor in the key generation function (KGF) to produce a symmetric encryption key that can be used to encrypt the sensitive data of the child which includes the child's private key.

Further, in some configurations, an RSA parent may have an RSA or ECC child. In other implementations an ECC parent may have and RSA or ECC child. Finally, for explanation purposes in the above discussion, the protected entity is a key. However, in other implementations the protected entity can be any storage blob that can be encrypted using the methods described above or other variations that should be recognized by the skilled artisan.

Exemplary Operating Environments

Figure 3:
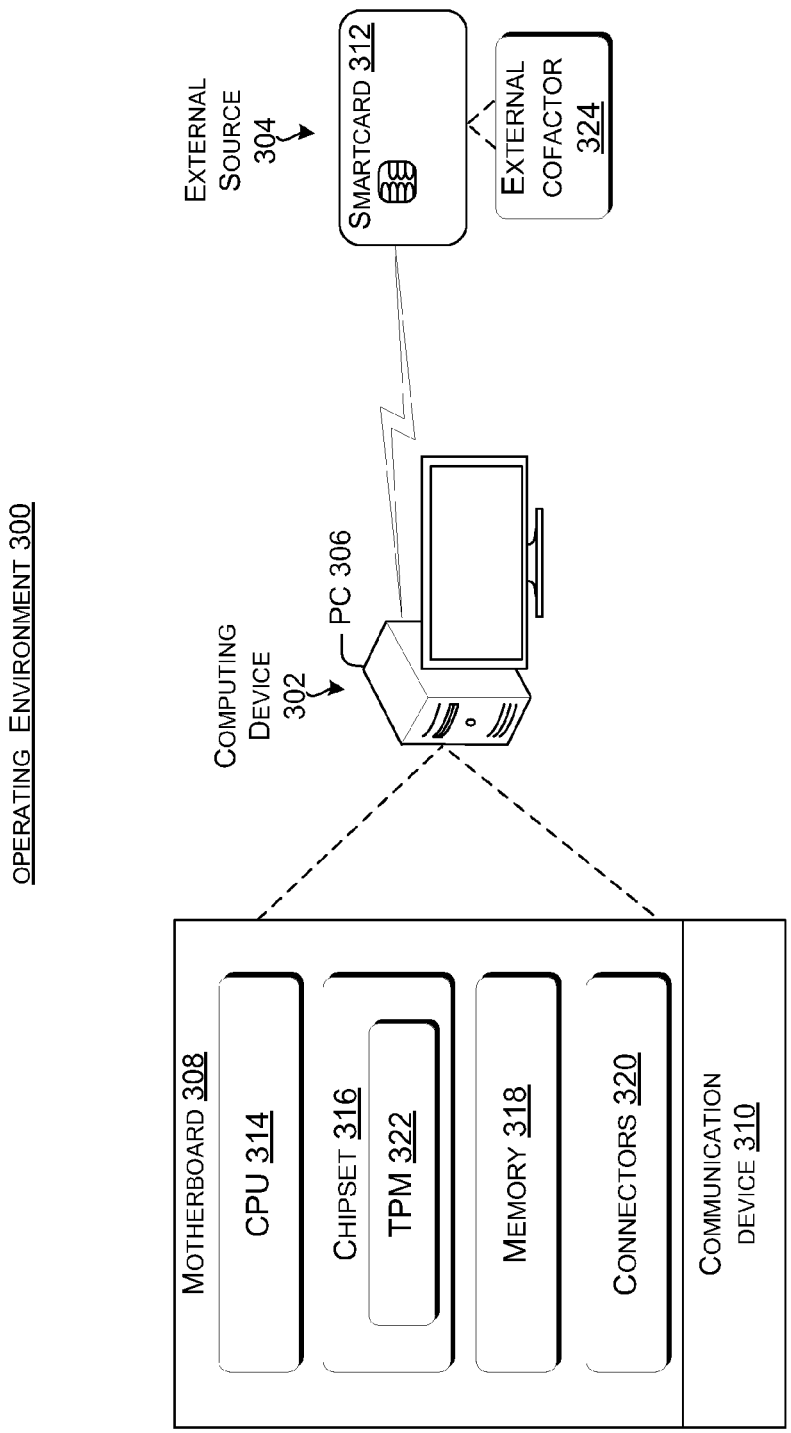
FIGS. 3-4 show exemplary operating environments in which exemplary TPMs can be employed in accordance with some implementations of the present concepts.
Figure 4:
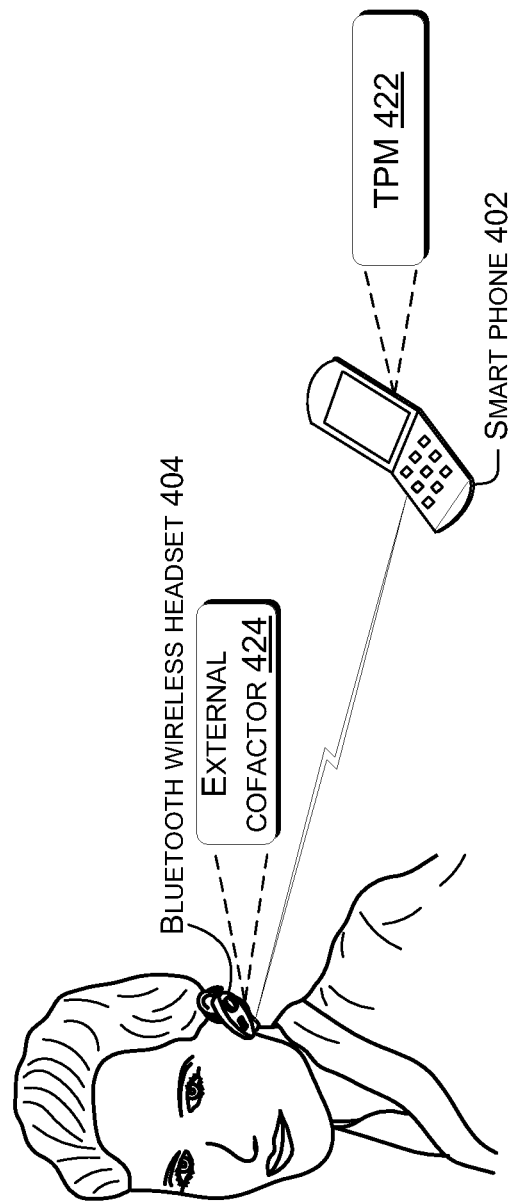

FIGS. 3-4 offer examples of two exemplary operating environments in which the present concepts can be employed.

FIG. 3 shows an exemplary operating environment 300 that includes a computing device 302 and an external source 304. In this case, computing device 302 is manifested as a personal computer (PC) 306 that includes a motherboard or logic board 308 and a communication device 310. In this instance, external source 304 is manifested as a smartcard 312.

Illustrated components of the motherboard 308 include a central processing unit (CPU) 314, a chipset 316, memory 318, and various connectors 320 for interfacing with other components, such as communication device 310, receiving power, etc. In this case, a trusted platform module (TPM) 322 is integrated onto chipset 316. In other instances, TPMs can be freestanding components or integrated with other components such as the CPU. The CPU 314, chipset 316, memory 318, and connectors 320 are not discussed in detail here, but their function and various possible configurations and variations should be readily known to the skilled artisan.

Smartcard 312 includes an external cofactor 324. The smart card can store the external cofactor in a known manner either in encrypted or unencrypted form. The smartcard can be configured so that is must physically contact the PC's communication device 310, such as a card reader for the external cofactor 324 to be transferred to the PC 306. Alternatively, the smartcard can employ wireless technology such as radio frequency identification (RFID), so that once the smartcard is within range of the PC's communication device 310, embodied as a wireless device, the external cofactor can be obtained by the PC. In either case, if the user has smartcard 312 in their possession, and the user leaves the proximity of the PC, the external cofactor becomes unavailable to the PC, and the PC cannot open further keys that were encrypted with both the TPM's keys and the external cofactor. For instance, the user could have the smart card in their pocket, an RFID tag on a bracelet or necklace, or in their wallet. If the user moves away from the PC, or the PC is taken away, from the user then the external cofactor becomes unavailable to the PC. Some implementations could place the external cofactor 324 on PC 306, but not within the TPM, however, such implementations may be less secure than where the external cofactor is maintained on a separate external source 304.

External cofactor 324 can be utilized by TPM 322 to encrypt key pairs as described above in relation to FIGS. 1-2. To summarize, key pairs encrypted by the by the TPM's SRK can utilize encryption data both from the TPM 322 and the external cofactor 324. Possession of either the TPM's encrypted data or the external cofactor does not allow a party to decrypt these key pairs. The present implementations improve the security offered by the TPM. At the same time, these implementations can leverage other security features offered by the TPM. For instance, the TPM is configured to offer tools for establishing operating policies.

In one such case, the TPM tools are configured to record system status (platform configuration registers (hereinafter, "PCRs")). So during boot-up, readings are recorded into the PCRs. The tools can be set to compare recorded or expected readings to actual readings. So that at a certain point the TPM's SRK can open a specified key only if the PCRs have the correct values. For instance, if the correct software was booted, or if the system is running at an expected or safe state, then if the correct authorization value is supplied along with the external cofactor then open a specified key pair.

In some configurations, once this sequence is started, the smart card can be removed from the system and the system will continue to run for the user. However, upon shutdown, the system will not restart for another party that does not have the smart card. Further, each user can have his/her own set of keys. Some keys can depend just on the TPM's SRK and others can include both the SRK and the external cofactor.

FIG. 4 shows another exemplary operating environment 400 that where a computing device is manifest as a smart phone 402 and an external source is manifest as a Bluetooth wireless headset 404 for communicating with the smart phone. In this implementation, smart phone 402 contains a TPM 422 and the Bluetooth wireless headset 402 contains an external cofactor 424. This configuration allows the smart phone's TPM to interrogate and obtain the external cofactor when both devices are activated and proximate to one another. If the smart phone is lost or stolen, any child key pairs made utilizing the TPM's private key and the headset's external cofactor are safe from attack even if the attacker manages to access the TPM's private key (SRKpriv).

FIGS. 3-4 collectively illustrate that exemplary TPMs can be employed on many different types of computing devices. Further non-limiting examples of computing devices can include Apple Brand computers, mini-computers, super-computers, personal digital assistants (PDAs), building or other security systems, etc. Similarly, many different types of external sources can contain the external cofactor. Besides smart cards and Bluetooth devices, other examples can include USB dongles, bioscanners, etc. Viewed one way, anything that could generate an authorization value (as discussed above in relation to FIG. 2) could be utilized to generate an external cofactor.

In summary, one point of the present concepts is to have some information (i.e., the external cofactor) that is not on the silicon (or other material) that forms the TPM. Non-limiting examples for storing the external cofactor are described above. The external cofactor could be a simple password (of course the entropy is not as high as provided by a more robust version). An attacker would not know how the external cofactor was generated or how big it is. Therefore, the attacker would not know how big a space they have to search, so the deterrence factor provided by the present concepts is quite high.

Exemplary Methods

FIG. 5 illustrates a flowchart of a method or technique 500 that is consistent with at least some implementations of the present concepts. The order in which the technique 500 is described is not intended to be construed as a limitation, and any number of the described blocks can be combined in any order to implement the technique, or an alternate technique. Furthermore, the technique can be implemented in any suitable hardware, software, firmware, or combination thereof, such that a computing device, such as the computing devices described above in relation to FIGS. 3-4 can implement the technique. In one case, the technique is stored on a computer-readable storage media as a set of instructions such that execution by a computing device causes the computing device to perform the technique.

Block 502 requests a trusted platform module (TPM) generate a child key pair utilizing a parent public key loaded on the TPM and an external cofactor that is not stored on the TPM. For instance, the TPM's storage root key (SRK) can be the parent key that is utilized to generate the child key pair. In other instances, the "parent" key may itself be an offspring of other keys pairs that have the SRK as an ancestral root.

Block 504 sends the external cofactor to the TPM. The external cofactor can be obtained from a source external to the TPM. The source may be on a computing device that contains the TPM, but more commonly the external cofactor can be obtained from a device that is distinct from the computing device on which the TPM occurs. For example, the external cofactor can be stored on a smart card or other device. The computing device containing the TPM can include a communication device, such as a card reader for interfacing with the other device and obtaining the external cofactor so that it can be sent to the TPM. An example of such a configuration is described above in relation to FIG. 3.

FIG. 6 illustrates a flowchart of a method or technique 600 that is consistent with at least some implementations of the present concepts. The order in which the technique 600 is described is not intended to be construed as a limitation, and any number of the described blocks can be combined in any order to implement the technique, or an alternate technique. Furthermore, the technique can be implemented in any suitable hardware, software, firmware, or combination thereof, such that a computing device, such as the computing devices described above in relation to FIGS. 3-4 can implement the technique. In one case, the technique is stored on a computer-readable storage media as a set of instructions such that execution by a computing device causes the computing device to perform the technique.

Block 602 receives a request to generate a child key pair utilizing a parent public key and an external cofactor that is not stored with the parent public key or with the child key pair. Various scenarios are described above. Parent and child are relative terms so in some instances, the parent public key may be the TPM's storage root key (SRK). In other instances the parent may be an offspring of the SRK.

Block 604 obtains the external cofactor and makes the child key pair. Many potential variations on this algorithm can fall within the scope of the present concepts. One such implementation is discussed above in relation to FIG. 2.

FIG. 7 illustrates a flowchart of a method or technique 700 that is consistent with at least some implementations of the present concepts. The order in which the technique 700 is described is not intended to be construed as a limitation, and any number of the described blocks can be combined in any order to implement the technique, or an alternate technique. Furthermore, the technique can be implemented in any suitable hardware, software, firmware, or combination thereof, such that a computing device, such as the computing devices described above in relation to FIGS. 3-4 can implement the technique. In one case, the technique is stored on a computer-readable storage media as a set of instructions such that execution by a computing device causes the computing device to perform the technique.

Block 702 requests a trusted platform module (TPM) load data secured by a parent key pair.

Block 704 sends an external cofactor to the TPM. In this case, the external cofactor may have been used to encrypt the child key data and is not stored on the TPM.

FIG. 8 illustrates a flowchart of a method or technique 800 that is consistent with at least some implementations of the present concepts. The order in which the technique 800 is described is not intended to be construed as a limitation, and any number of the described blocks can be combined in any order to implement the technique, or an alternate technique. Furthermore, the technique can be implemented in any suitable hardware, software, firmware, or combination thereof, such that a computing device, such as the computing devices described above in relation to FIGS. 3-4 can implement the technique. In one case, the technique is stored on a computer-readable storage media as a set of instructions such that execution by a computing device causes the computing device to perform the technique.

Block 802 receives a request to load data secured by a parent key pair loaded on a TPM.

Block 804 decrypts the data using a parent key and an external cofactor that is not stored with the parent key or the child data.

To summarize, beyond existing methods, a calling sequence for creating and loading of various TPM entities (keys, encrypted blobs, etc.,) can be modified so that the caller may provide the external cofactor when loading a key or other entity or when unsealing data structures. This external cofactor can be used in a key generation function along with the information provided by the entity parent in order to generate the key that is used to encrypt the data in the entity.

When a caller creates a TPM entity such as a child key pair, the caller can specify that the entity be protected by both the TPM's parent encryption key and the external cofactor. In such a case, the caller may provide the external cofactor that can be mixed with the parent-dependent information to create the symmetric key used to encrypt the sensitive portions of the created entity.

When the created entity is subsequently loaded onto or is processed by the TPM, it will be necessary for the caller to again provide the external cofactor so that the encrypted portion of the entity can be decrypted.

This technique does not reduce the strength of the protections provided by the TPM. It does, however, provide additional protections such that the entities protected with the external cofactor are not compromised if the private portion of the SRK is somehow disclosed.

CONCLUSION

Although techniques, methods, devices, systems, etc., pertaining to TPM security scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
a trusted platform module (TPM) configured to:
store a parent key pair comprising a parent private key and a parent public key,
store an authorization value indicative of a status of the computing device during boot-up,
receive another authorization value and an external cofactor stored separately from the TPM from a communication device coupled to the TPM,
combine the parent public key with the external cofactor to generate a child key pair comprising a child private key and a child public key when the another authorization value matches the authorization value,
combine a random value with the external cofactor to generate a symmetric encryption key to encrypt the child private key of the child key pair, and
use the parent public key to encrypt the random value when the another authorization value matches the authorization value, and
use the parent private key to decrypt the encrypted random value and combine the decrypted random value with the external cofactor to recover the symmetric encryption key to decrypt the encrypted child private key when the another authorization value matches the authorization value.

2. The computing device of claim 1, wherein the TPM comprises one of: a freestanding chip in the computing device and an integrated component of a chipset of the computing device.

3. The computing device of claim 1, wherein the communication device comprises one of: a card reader, a USB port, a bioscanner, or a Bluetooth device.

4. The computing device of claim 1, further comprising an external source configured to store the external cofactor.

5. The computing device of claim 4, wherein the external source comprises one of: a smart card, a USB device, or a Bluetooth device.

6. A method, comprising:
storing on a trusted platform module (TPM) a parent key pair comprising a parent private key and a parent public key;
storing on the TPM an authorization value indicative of a status of the computing device during boot-up;
receiving another authorization value and an external cofactor stored separately from the TPM from a communication device coupled to the TPM;
combining the parent public key with the external cofactor to generate a child key pair comprising a child private key and a child public key when the another authorization value matches the authorization value;
combining a random value with the external cofactor to generate a symmetric encryption key to encrypt the child private key of the child key pair;
using the parent public key to encrypt the random value when the another authorization value matches the authorization value;
subsequently using the parent private key to decrypt the encrypted random value; and,
combining the decrypted random value with the external cofactor to recover the symmetric encryption key to decrypt the encrypted child private key when the another authorization value matches the authorization value.

7. The method of claim 6, wherein the receiving the external cofactor comprises receiving the external cofactor from an external source coupled to the communication device.

8. A system, comprising:
a trusted platform module (TPM) configured to:
store a parent key pair comprising a parent private key and a parent public key,
store an authorization value indicative of a boot-up status,
receive another authorization value and an external cofactor stored separately from the TPM from a communication device coupled to the TPM,
combine the parent public key with the external cofactor to generate a child key pair comprising a child private key and a child public key when the another authorization value matches the authorization value, combine a random value with the external cofactor to generate a symmetric encryption key to encrypt the child private key of the child key pair, use the parent public key to encrypt the random value when the another authorization value matches the authorization value, and use the parent private key to decrypt the encrypted random value and combine the decrypted random value with the external cofactor to recover the symmetric encryption key to decrypt the encrypted child private key when the another authorization value matches the authorization value.

9. The system of claim 8, wherein the TPM is manifest on a single device that also includes the communication device and wherein the boot-up status relates to the single device.

10. The system of claim 8, wherein the system includes an external device that has the external cofactor stored thereon or wherein the system does not include the external device.

\* \* \* \* \*